Feb. 26, 1957 J. F. HOWELL 2,783,387
RAY DETECTING SYSTEM AND METHOD OF STABILIZING SAME
Filed Feb. 2, 1953 2 Sheets-Sheet 1

INVENTOR:-
JOHN F. HOWELL
By: Junius D. Cook, Jr.
ATTORNEY

Feb. 26, 1957 J. F. HOWELL 2,783,387
RAY DETECTING SYSTEM AND METHOD OF STABILIZING SAME
Filed Feb. 2, 1953 2 Sheets-Sheet 2

INVENTOR:
JOHN F. HOWELL
By: Junius J. Cook, Jr.
ATTORNEY

United States Patent Office 2,783,387
Patented Feb. 26, 1957

2,783,387

RAY DETECTING SYSTEM AND METHOD OF STABILIZING SAME

John F. Howell, Milwaukee, Wis., assignor to General Electric Company, a corporation of New York Application February 2, 1953, Serial No. 334,664

18 Claims. (Cl. 250—83.3)

The present invention relates in general to electronics, and has more particular reference to means for and method of controlling or regulating the operation of penetrating ray detecting systems.

Penetrating rays, such as X-rays and the like, may be employed for the inspection of various objects to determine hidden features thereof. For example, X-rays are commonly applied through body portions of human beings and other animals to determine the physical condition of bones and other body components, as by fluoroscopic and photographic techniques. Penetrating rays may also be employed for the inspection of inanimate objects, including manufactured articles, to discover the internal condition of such articles, as, for example, the detection of cracks, flaws, or voids in metal castings and other objects, the inspection of sealed containers, including food or beverage cans, to determine whether or not the same are filled to a desired level, and for various other inspectional purposes, including the detection of foreign bodies or voids in packaged and other products.

For purposes of penetrating ray inspection, a suitable ray source may be employed to produce and direct a scanning beam through the object to be inspected and upon a sensitive ray detector, whereby to alter the electrical characteristics of the detector in proportion to or as a function of the intensity of the ray where it impinges upon the detector, the variable internal condition of objects under inspection being thus determined in terms of intensity variations of the detector impinging ray as measured by changes in the electrical characteristics of the detector.

The detector in turn may be interconnected in an electrical translation system, adapted to operate in response to changes in the electrical characteristics of the detector, in order to manifest such changes in any desired fashion, as by causing the operation of suitable signaling, recording, or warning devices, or other suitable responsive equipment adapted for operation as and when the electrical characteristics of the detector show a predetermined variation from a preselected value. The inspection apparatus thus may serve to detect the presence of such abnormal conditions in the object or article under inspection, as will change the intensity of the scanning ray and thus alter the characteristics of the detector to the predetermined degree required to cause actuation of the responsive operating equipment driven by the translation system under the control of the detector.

In such systems, especially where extreme precision is desirable, if not essential, to the proper performance of the apparatus, it has heretofore been necessary to provide means for producing X-rays of uniform intensity for application to the object under inspection so that false operation of the detector means and translation system, and of the operable devices actuated thereby, be not caused as the result of intensity fluctuations in the inspecting ray, as emitted from the ray source, as distinguished from intensity fluctuations imparted in the ray as the result of passage thereof through the object being inspected.

Since electrically actuated ray generating tubes are usually employed as ray sources for inspectional purposes, and since the intensity of penetrating rays emitted by such generating tubes is a function of tube actuating voltage applied to the tube, it has heretofore been considered necessary to provide relatively expensive voltage regulating equipment for assuring operation of the generating tube for the production and emission of rays of substantially uniform intensity for inspectional purposes.

An important object of the present invention is to provide relatively simple and inexpensive means for controlling the operation of a penetrating ray detector and associated translation system so that the same may accomplish the precise detection of ray energy fluctuations imparted in the ray as the result of passage through an object under inspection, without regard to fluctuations in ray intensity at the ray source as the result, for example, of fluctuations in the actuating voltage of a ray generating tube forming the ray source.

Another important object is to provide means for continuously monitoring the intensity of a penetrating ray, as emitted from a ray source, and altering the response characteristics of an associated ray detection system in accordance with ray intensity fluctuations of the source emitted ray in order to compensate for energy fluctuations in the ray, as emitted from the source, and thereby cause the detection system to respond precisely to energy fluctuations imparted in the ray as the result of passage thereof through an object being inspected.

Another important object is to provide, in a system of the character mentioned, a monitoring detector element having electrical characteristics adapted to fluctuate as a function of the intensity of rays impinging thereon, such element being disposed in the path of rays emitted from a ray source and being electrically connected in a detector system, responsive to rays emitted by said source through an examination object.

Another object of the invention is to employ, as a ray monitoring element, a suitable semi-conductor material, such as cadmium or mercury sulphide, or cadmium selenide, the same being electron donor semi-conductors exceedingly sensitive to energy intensity variations in rays impinging thereon, and being hence particularly well suited for employment in the system of the present invention.

Another important object is to provide inspection equipment comprising a suitable source of penetrating rays, such as X-rays, ray sensitive detecting means spaced from the source and arranged to discriminate between relatively small intensity changes in rays reaching the detecting means through an object being inspected or scanned by the ray, such changes being caused by differences in relative ray translucence of adjacent portion of such object, the equipment including electrical translation means actuated by the detecting means in response to predetermined intensity variations in the impinging ray as measured by the detecting means, and a ray sensitive monitoring detector responsive to energy fluctuations in the penetrating ray as emitted from said source, said monitoring detector being interconnected with said translation system to control the operation of the same in accordance with such intensity variations.

The foregoing and numerous other important objects, advantages, and inherent functions of the invention will become apparent as the same is more fully understood from the following description, which, taken in connection with the acompanying drawings, discloses a preferred embodiment of the invention.

Referring to the drawings.

Figure 3:
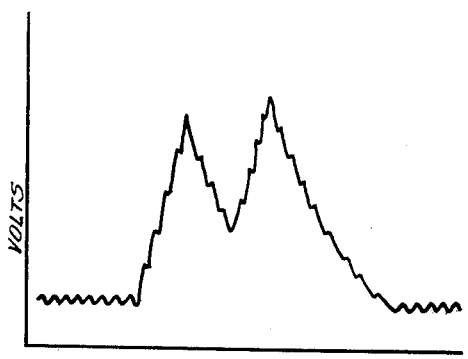
Figure 6:
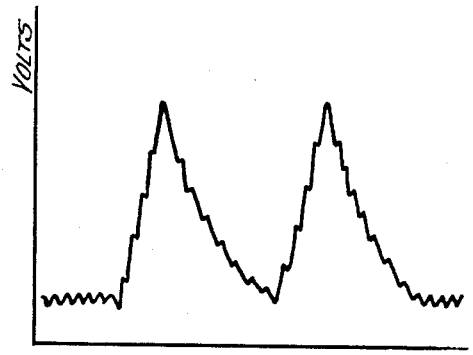
Figure 4:
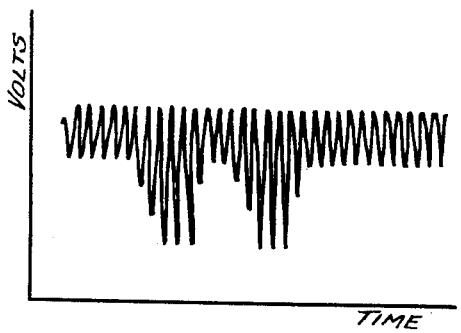
Figure 7:
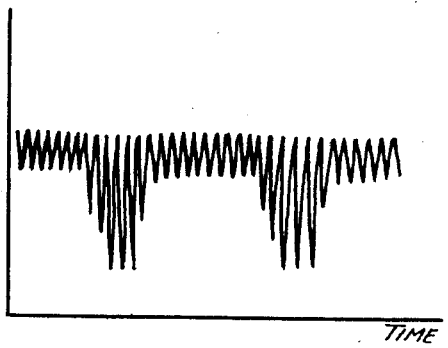
Figure 5:
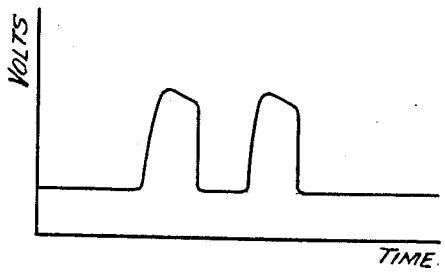
Figure 8:
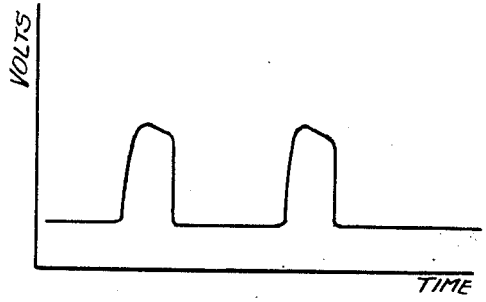

Figs. 3, 4, and 5 comprise graphical representations of voltage conditions which prevail at several stations in the system when in operation under particular operating conditions; and Figs. 6, 7, and 8 comprise graphical representations of voltage conditions which prevail in the system, at the same several stations, under different operating conditions.

To illustrate the invention, the drawings show apparatus for inspecting containers 11 in order to determine the internal condition of the contents thereof, as, for example, whether or not the containers are all filled to a desired level. The present invention is not necessarily restricted to the inspection of any particular object, nor to the detection of incorrectly filled containers, but may, indeed, be employed in any inspection system wherein an object is scanned by a penetrating ray and the internal condition of the scanned object determined by measuring the intensity of the scanning ray after it has traversed the object under examination.

For the purpose of demonstrating the invention, however, the same has been shown as applied in apparatus of the sort providing for the inspection of metal cans of the class commonly employed as containers for beer, oil, or other liquid products, in order to determine whether or not the cans are filled to a desired level, and to mark, eject, separate or otherwise distinguish between correctly and incorrectly filled containers. To this end, suitable means may be provided for moving the cans 11 in succession along a predetermined path, as indicated by the arrow 12, in a direction to pass each can successively across a scanning beam 13 emitted by a suitable penetrating ray source 14, preferably through a suitable collimator, to constitute the scanning beam as a thin pencil-like ray. The collimator may comprise a screen 15 of ray impervious material, such as lead, having an opening disposed in position to transmit the pencil-like beam 13 across the path of movement of the cans and cause the beam to impinge upon a suitable ray sensitive detector device 16.

The sensitive device 16 may thus be irradiated by the beam 13 after the same has passed through a container 11. The container, of course, may be supported during its movement at such an elevation that the ray beam 13 will scan the container at the level to which it is desired that the same be filled. If the container be filled to or above such scanning level, the ray beam will pass through the contents of the container in reaching the detector device 16; but, if the fill level of the container be below the scanning level, the ray beam will pass through the container above the contents therein. The intensity of the ray beam impinging upon the element 16 will be detectably lower when the contents of the container extend to or above the level at which the ray beam penetrates the same than when the container is filled below said level.

Any suitable means, such as an X-ray tube having a cathode and a cooperating anode, may be employed as a ray source 14, the anode of the tube constituting a source of X-rays when energized by the impingement of electrons emitted by the cathode. The X-ray tube may be electrically energized for operation by means of electrical power, delivered from a suitable power source 17, through any preferred or conventional power supply system, which may comprise transformer means 18 including windings 19 connected for the application of electrical potential for electron driving purposes between the anode and cathode of the tube, and windings 20 connected with the cathode of the tube to excite the same for electron emission. In that connection, it should be understood that an X-ray generating tube operates to constitute its anode as an X-ray source in response to impingement thereon of electrons emitted at the cathode and driven thence to the anode under the influence of electrical potential applied between the cathode and anode.

In some instances, it is desirable to apply uni-directional potential between the anode and cathode of the tube for the operation of the same. In such case, suitable rectifier means may be interconnected between the transformer windings 19 and the anode and cathode of the tube, to thereby supply uni-directional anode-cathode potential for the operation of the ray generating tube. For most purposes, however, the operating potential applied between the anode and cathode of the tube may be of alternating character of the sort supplied through the transformer windings 19 from a suitable alternating power source 17, since X-ray tubes have inherent rectifying characteristics in that electron flow between cathode and anode may occur in only one direction.

Accordingly, when in operation with alternating potential applied between anode and cathode, an X-ray generating tube will function as a half wave rectifier and will impinge ray generating electrons on the anode only during the positive half cycle periods of the electron driving anode-cathode potential. As a consequence, the generated rays will be produced in pulses of intensity proportional to the half cycle values of applied anode-cathode potential. When uni-directional potential is applied between the anode and cathode of the tube, the resulting rays will be produced continuously at the anode at intensity values proportional to the applied uni-directional anode-cathode potential.

It will be understood, of course, that the inspection equipment, including particularly the ray source 14, the sensitive detector 16, and the collimator means 15, is preferably mounted at a fixed elevation with respect to the means employed for supporting the object or objects 11 to be inspected, where the desired inspectional result is the determination of the fill level in the inspection article or articles. It may, however, be desirable to provide for the vertical adjustment either of the inspection article support means or of the inspection equipment itself. Ordinarily, the invention may be embodied in equipment wherein the relative elevation of the inspection equipment and of the inspection article support means remains constant.

The invention, however, is not limited to such fixed elevation relationship, but contemplates the possibility of providing means for suitably adjusting the inspection article support means with respect to the inspection equipment, or vice versa. To this end, the ray source 14 and the collimator 15 may be mounted on one side of the inspection object, as by any suitable mounting frame means, which may provide for the adjustment of the ray source and collimator with respect to an examination object supported in scanning position. The sensitive detector means 16 likewise may be mounted in suitable support means providing for the adjustment of the detector means with respect to the examination object, the detector means being thus mounted upon the side of the examination object remote from the ray source.

Any suitable ray sensitive means adapted to change its electrical characteristics in proportion to the intensity of rays impinging thereon may be employed as a detector. Preferably, the detecting element 16 comprises a crystalline ray sensitive semi-conductor material, such as cadmium or mercury sulphide, or cadmium selenide. For the purpose of explaining the present invention, a semi-conductor may be defined as a substance having electrical resistance or reactance, or both, which vary in accordance with the intensity of rays to which the substance is exposed, the combined electrical resistance and reactance of a conductor being commonly referred to as the impedance thereof. Cadmium and mercury sulphides, and cadmium selenide, in this respect, have been found to be semi-conductors usefully sensitive to X-rays, the same in the absence of X-rays having impedance characteristics of such high order as to constitute the same as virtual insulators capable of substantially preventing the flow of electrical energy therethrough. The electrical characteristics of the named materials are such that the impedance thereof progressively declines or becomes reduced in proportion to the intensity of X-rays impinging thereon and, as more fully explained in copending applications for U. S. Letters Patent Serial No. 190,801, filed October 18, 1950, now Patent No. 2,706,790, and Serial No. 232,073, filed June 18, 1951, now Patent No. 2,706,791, the intensity of impinging X-rays may be accurately measured in terms of the apparent impedance of the sensitive semi-conductor element 16.

The named semi-conductors may also be distinguished from commonly known semi-conductors in that they exhibit current amplifying characteristics when irradiated with X-rays. Semi-conductors operate as such through the release of electrons, entrapped therein, when subjected to energy rays to which sensitive. Commonly known semi-conductors, such as selenium, none of which are to any appreciable or useful extent sensitive to penetrating rays, such as X-rays, operate to release electrons in direct proportion to changes in the electrical space charge of the material, as the result of ray impingement thereon, and thus do not show current amplifying characteristics. The sulphides of cadmium and mercury, however, as well as the selenide of cadmium, release many thousands or hundreds of thousands of electrons in response to unit alteration of the space charge therein, when excited by penetrating rays, including X-rays, to which said materials are sensitive. The sensitive element 16 thus, in effect, comprises a tiny amplifier capable of delivering a substantial quantity of electrical current when excited by X-rays.

It is thought that the amplifying character of the crystals is due to the fact that cadmium and mercury sulphide and cadmium selenide comprise what may be called excess electron or electron donor semi-conductors, the excess energy necessary to produce amplified currents in the crystal being derived from the electron producing character of the material itself, when irradiated or triggered by exposure to X-rays. It is suggested that electron donor centers in each crystal become ionized by the impinging X-rays, thus forming stationary positive space charges in the material. The amplifying character of these electron donor materials can be compared to that of a conventional triode tube where the grid is assumed to be floating. In such a tube the grid takes up a negative charge as the result of electron flow therein, thus reducing the plate current to a small value. If the grid of such a tube is charged positively, the current flow therein will materially increase. In electron donor type of crystal material, the conduction electrons are, to a large extent, localized in traps, thus forming a current-reducing, stationary, negative space charge. Upon ray impingement on the crystal, its electron donor centers become ionized, thus assuming positive charges. These stationary positive charges are thought to act in the same way as do positive charges on the grid of a triode tube. One positive hole, or center, so established in the crystal, appears to control the flow of more than ten thousand electrons in the crystal. This is in contradistinction to the action of ordinary photo-sensitive conductors, such as selenium, where this amplification mechanism is absent. As a consequence, electrical energy is released in the electron donor type of crystal material in the form of crystal current that is many times the energy applied to the crystal by the exciting ray, the action being such as to render these electron donor semi-conductors detectably sensitive to X-rays.

X-ray sensitive crystals of cadmium and mercury sulphide and of cadmium selenide may be grown in the form of hexagonal prisms, by vapor phase procedures. Such a crystal may be electrically connected at its opposite ends, by means of suitable conductors 25, 26, as by coating the opposite ends of the crystal each with a layer or plate of electrical conducting material with which the conductors 25 and 26 may be electrically joined; and the present invention utilizes the ray sensitive semi-conducting and amplifying characteristics of the crystal element 16 for differentiating the intensity of rays reaching the crystal through portions of the examination object of unlike ray translucence, by providing for continuously measuring the apparent impedance of the detector element 16. Any appreciable increase or decrease in the so-measured impedance of the element will indicate a corresponding decrease or increase in the intensity of the impinging ray beam, and consequently will show changes in the relative ray opacity of the portions of the examination object scanned by the ray beam.

Any suitable or preferred means may be employed for continuously determining the impedance of the detector element 16, in order thus to ascertain the internal physical character of the examination object at the portions thereof scanned by the beam 13. Such means may comprise an electronic translation system 27 adapted to actuate a suitable load device 28, which may serve to operate any desired indicating, recording, marking, or ejecting equipment or other mechanism which it may be desired to actuate in response to the detection of a selected condition in the examination object.

Figure 1:
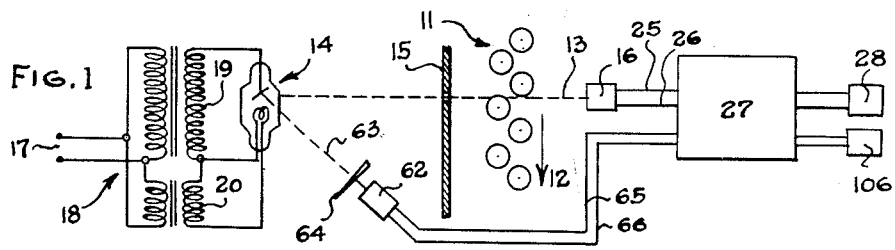
Fig. 1 is a diagrammatic representation of a ray detecting system embodying the present invention.
Figure 2:
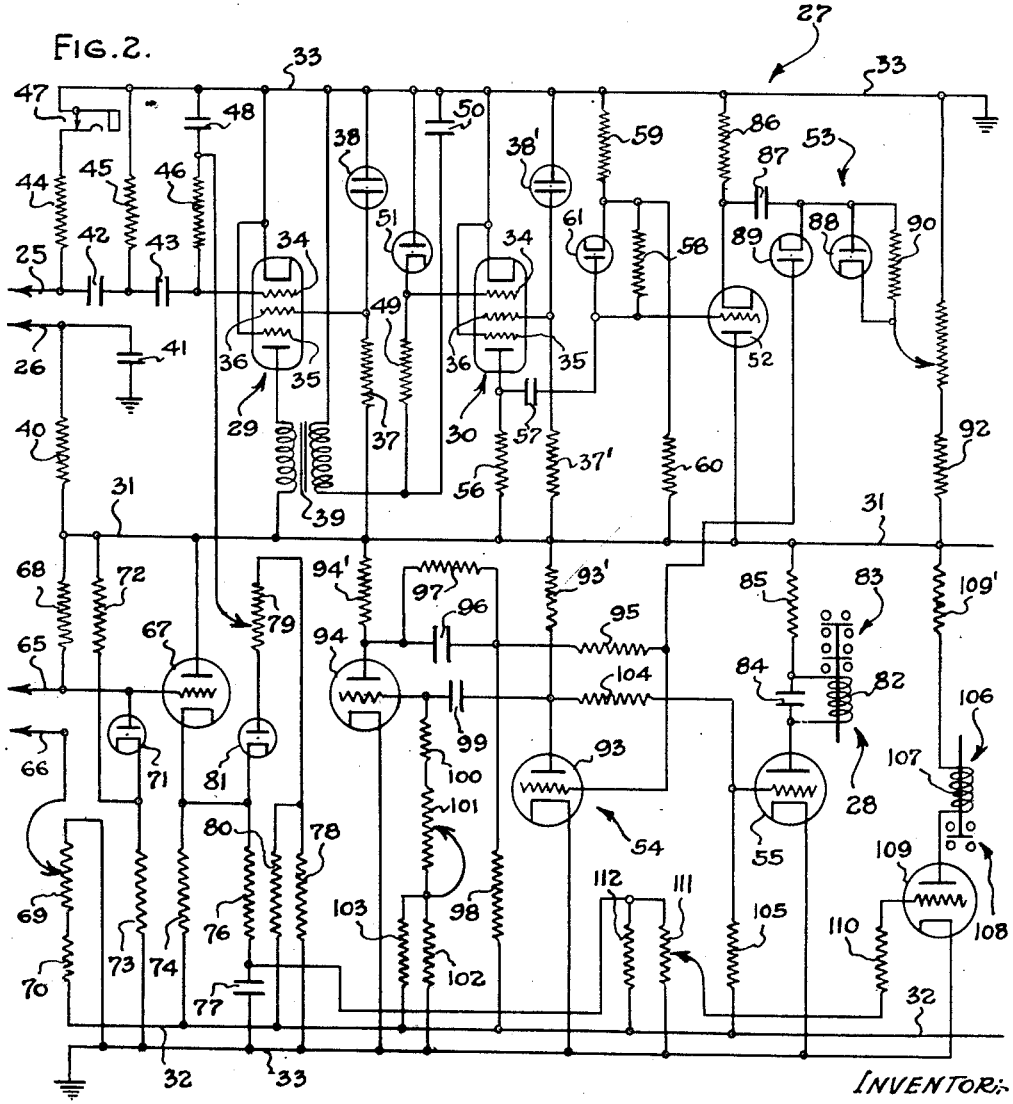
Fig. 2 is a diagrammatic showing of a portion of the system illustrated in Fig. 1.

The translation system 27, as shown more particularly in Fig. 2, may comprise a pair of electron flow amplifiers 29 and 30 interconnected in tandem relationship and operable in response to predetermined change in the impedance of the detector device 16 to actuate the operable device 28 in response to such change. The translation system may be electrically energized from suitable power supply conductors or bus bars 31 and 32. The conductor 31 preferably carries relatively high positive potential of the order of 250 volts, the conductor 32 preferably carrying negative potential of the order of 150 volts, grounded or return conductor means 33 being also provided to facilitate the construction of the translation system.

The amplifiers 29 and 30 may comprise each an anode, a cathode, a control grid 34, and a pair of screen grids 35 and 36, the cathodes of the amplifiers being connected to ground and the screen grids 35 of each amplifier being connected with the grounded cathode thereof. The screen grids 36 of both amplifiers may be connected with the power bus 31, each through a corresponding voltage control resistor 37, and each may be connected to ground through a corresponding gaseous diode 38 for determining the operating voltages on the screen grid.

The anode of the amplifier 29 may be connected with the positive voltage bus 31 through the primary winding of a coupling transformer 39 or other suitable means for applying the output energy of the amplifier 29 upon the grid 34 of the amplifier 30. One side 26 of the detector 16 may be connected with the power supply bus 31, through a suitable resistor 40, and to ground through a condenser 41. The other side 25 of the detector 16 may be connected with the control grid 34 of the amplifier 29 whereby the same may be constituted as means for continuously measuring the impedance of the detector 16 in terms of electrical energy delivered upon the control grid 34 of the amplifier 30, through the coupling means 39. The side 25 of the detector 16 remote from the bus 31 is preferably connected with the control grid 34 of the amplifier 29 through one or more condensers 42 and 43, whereby to operate the amplifier 29 only in response to the fluctuating component of impedance measuring current produced in the detector circuit.

In that connection, it should be understood that current flow in the detector circuit under the control of the detector 16 may include a fluctuating component as well as a uni-directional component, the fluctuating component corresponding with the energy fluctuations of the X-ray beam where the same is the product of a conventional X-ray tube energized by alternating potential applied between the anode and cathode of the tube. Where the ray source 14 is of a sort producing rays of uniform, nonfluctuating intensity, there will, of course, be no fluctuating component in the current flowing in the detector circuit, and other translation means than the condensers 42 and 43 will have to be provided for applying impedance measuring energy on the control grid of the amplifier 29.

As explained in the aforesaid copending applications for U. S. Letters Patent Serial No. 190,801 and Serial No. 232,073, high speed ray detection response of the inspection equipment may be accomplished by utilizing only the alternating component of current in the detector circuit, the response of the detector in terms of the uni-directional current component being relatively slow. As a consequence, for high speed scanning purposes requiring substantially instantaneous response, it is desirable to utilize a scanning beam 13 of the sort produced by an X-ray tube when energized with alternating potential applied between the anode and cathode thereof, such a beam comprising a radiant energy emanation of cyclically fluctuating intensity, and to employ only the corresponding fluctuating component of electrical energy in the detector circuit for actuating the system.

For certain slow speed inspectional purposes, however, it may be possible to employ the uni-directional component of electrical energy, in the detector circuit, either alone or in combination with a fluctating component, by eliminating the condensers 42 and 43 and replacing the same with other transfer means, including, if desired, suitable filter means for excluding the fluctuating energy component from the control grid 34 of the amplifier 29, while passing to said control grid either the uni-directional component only, or the combined fluctuating and uni-directional components. Such arrangement, however, would materially reduce the response speed of the inspection equipment, and is, therefore, undesirable for inspection purposes at high speed.

As shown, control resistors 44, 45, and 46 may be employed for connecting the detector circuit to ground, the resistor 44 being connected at one end between the detector 16 and the condenser 42, the other end of the resistor being connected to ground preferably through a normally closed test jack switch 47. The resistor 45 is connected at one end between the condensers 42 and 43, the other end of the resistor being connected to ground. The resistor 46 is connected at one end between the condenser 43 and the control grid 34 of the amplifier 29, the other end of the resistor being connected to ground preferably through a condenser 48, for purposes hereinafter more fully explained.

The energy output of the amplifier 29 may be applied in any suitable or preferred fashion to the control grid 34 of the amplifier 30. As shown, one side of the secondary winding of the coupling transformer 39 may be connected to ground, the other side of said winding being connected with the control grid 34 of the amplifier 30 through a resistor 49, a condenser 50 being interconnected between ground and the grid remote end of the resistor 49. The control grid 34 of the amplifier 30 may also be connected to ground through a control tube 51 having a cathode connected with the control grid, and an anode or plate connected to ground.

The energy output of the amplifier 30 may be applied in any preferred manner to control the operation of the device 28. As shown, the output of the amplifier may be applied through a cathode follower tube 52, an amplitude selecting network 53, and a timing network 54 to control a relay actuating tube 55 for the operation of the device 28. To this end, the anode of the amplifier 30 may be connected to the power supply bus 31 through a resistor 56 and to the control grid of the cathode follower tube 52 through a condenser 57. The grid of the follower tube 52 also may be suitably biased by electrical potential supplied from the bus 31. For such purpose, the grid of the tube 52 may be connected to ground through a pair of resistors 58 and 59, interconnected in series, said grid being also connected with the power supply bus 31 through the resistor 58 and a resistor 60. A control tube 61, similar to the tube 51, may be interconnected in parallel relation with the resistor 58, the cathode element of said tube 61 being connected with the joined ends of the resistors 58 and 59 and its anode element being connected with the control grid of the tube 52 and the grid connected end of the resistor 58. The cathode follower tube 52 is thus adapted for operation in accordance with the output energy delivered by the amplifier 30 subject to the regulation provided by the tubes 51 and 61 operating as voltage restorers.

When the scanning device is in operation, the translation system will transmit energy at a substantially uniform intensity level so long as the article being inspected presents portions of uniform ray opacity in the path of the scanning beam. As soon as a portion of the inspection article of opacity either greater or lesser than such uniform opacity is presented in the ray beam, the signal impulse delivered in the system upon the control grid of the tube 52 will correspondingly change, the intensity of the signal increasing with decrease in opacity of the portions of the examination object traversed by the scanning beam, and vice versa.

The transmitted signal, of course, will be of uniformly fluctuating character where the ray source 14 itself is of uniformly fluctuating intensity, as where the source comprises an X-ray tube operated by the application of alternating potential on the anode and cathode of the tube. Where the rays emitted by the source 14 are of continuously uniform intensity, the signal applied on the grid of the tube 52 will likewise be of uniform character.

It will be seen, however, that variations in the intensity level of the signal applied on the grid of the tube 52, whether the same be of constant or uniformly fluctuating intensity, may be caused by changes in the operating potential applied between the anode and cathode of the ray source 14. Such operating potential changes, of course, will correspondingly alter the intensity level of rays emitted by the anode of the tube. As a consequence, unless the intensity level of the ray beam 13, as emitted from the source 14, is continuously maintained at a uniform value, it will be seen that false operation of the system may be caused by an increase or decrease in signal intensity at the grid of the tube 52 due to variations in the intensity level of the ray beam, as emitted by the source, rather than by changes in the intensity of the scanning beam as applied on the detector 16 and caused by passage of the beam through the article being scanned.

In order to eliminate such possibility of false operation of the apparatus, the present invention provides for continuously regulating the operation of the translation system 27 in order to correspondingly increase or decrease the intensity of the signal delivered on the grid of the tube 52 in inverse proportion to changes in the intensity level of the scanning beam as emitted by the ray source, such variations ordinarily being caused by voltage fluctuations applied in the system at the primary power source 17. To this end, the present invention provides for continuously monitoring the intensity of the scanning ray 13, as emitted by the source 14, and accordingly controlling the translation system. The scanning beam, according to the present invention, is continuously monitored by means of a monitoring detector 62 disposed in position exposed to a penetrating ray 63, which emanates from the ray source 14 at an intensity at all times corresponding with the intensity of the scanning ray 13. If desired, a filter 64 may be applied in the path of the ray 63, and such filter may be of wedge-shaped sectional configuration or otherwise formed to permit adjustment of the intensity of the ray 63 impinging upon the monitoring detector 62.

While the monitoring detector 62 may comprise any suitable ray sensitive means, it preferably comprises a crystal or crystals of a suitable ray sensitive semi-conductor material, such as cadmium or mercury sulphide, or cadmium selenide, that is to say, the monitoring detector 62 and the scanning beam detector 16 may comprise duplicate elements. The monitoring detector may be interconnected in any suitable or preferred fashion with the translation system 27. As shown, the detector 62 can be connected to modify the signal applied upon the control grid 34 of the amplifier 29. To this end, the monitoring detector 62 may be electrically connected, as by means of conductors 65 and 66, to control the operation of a relay tube 67 having an energy output circuit connected with the control grid 34 of the amplifier 29.

To this end, the control grid of the tube 67 may be electrically connected with the monitoring detector through the conductor 65, said grid being also connected with the power bus 31 through a resistor 68. The monitoring detector, by means of the conductor 66, may be connected with the power supply bus 32 through an adjustable potentiometer 69, one side of which is connected to ground, the other side being connected with the power supply bus 32, as through a resistor 70. The grid of the tube 67 also may be connected with a control tube 71 and thence, through a resistor 72, with the power supply bus 31 and to ground through a resistor 73, the anode of the tube 71 being connected with the grid of the tube 67, and its cathode being connected with the joined ends of the resistors 72 and 73.

The anode of the tube 67 may be connected with the power supply bus 31. Its cathode may be connected through a resistor 74 with the power supply bus 32, and to ground through a resistor 76 and condenser 77, in series. The cathode of the tube 67 may also be connected through an adjustable network 75 with the control grid 34 of the amplifier tube 29, said network including a resistor 78 and an adjustable potentiometer 79 interconnected in series with a control tube 81 between ground and the cathode of the tube 67, the anode of the control tube being connected with the potentiometer 79, and its cathode being connected with the cathode of the tube 67, the potentiometer connected end of the resistor 78 being connected with the power bus 32 through a resistor 80, and the adjustable member of the potentiometer 79 being connected in the grid control circuit of the amplifier 29, between the resistor 46 and the grounded condenser 48.

As a consequence of the foregoing arrangement, it will be seen that the energy output delivered by the amplifier 29 will correspond not only with the measured impedance of the scanning detector 16, but will also be related to the impedance of the monitoring detector 62. By adjusting the apparatus, more particularly by means of the potentiometers 69 and 79 and by means of the adjustable filter 64, the response of the monitoring detector 62, as measured by the tube 67 and its associated equipment, may be utilized to nullify and exactly offset, in the signal transmitted by the amplifiers 29 and 30 to the grid of the tube 52, any signal variations that would otherwise be contained in the signal as the result of changes in the average intensity level of the scanning beam 13, as emitted by the ray source 14. As a consequence, the signal transmitted in the system 27 for operation of the device 28 will correspond only with changes of intensity, imparted in the scanning beam by the object or objects under inspection, and not to fluctuations in average intensity of the ray as emitted at the ray source. Accordingly, the possibility of false operation of the system will be eliminated.

In order to apply the signal transmitted in the system 27 for the selective operation of the device 28, the tube 52 may be connected to control the operation of the amplifier tube 55 in any suitable fashion, the tube 55 in turn being connected to control the operable device 28 which, as shown in the illustrated embodiment, may comprise a relay switch having an operating coil 82 and switch contacts 83 adapted to be actuated by the coil 82. For such purpose, the cathode of the tube 55 may be connected to ground. Its anode or plate may be connected with the power supply conductor 31 in series through a condenser 84 and a resistor 85, the actuating coil 82 of the device 28 being connected in parallel with respect to the condenser 84.

The tube 55 may be held normally inactive and may be rendered operable to energize the coil 82 whenever a signal in excess of a predetermined intensity level is transmitted by the translation system 27 as a result of response of the detector 16 to predetermined variation in the intensity of the scanning beam 13 impinging thereon.

Any suitable translation means may be employed for applying the output of the tube 52 for the control of the tube 55. As shown, the plate of the tube 52 may be connected with the power supply conductor 31, and its cathode may be connected to ground through a resistor 86. The cathode of the tube 52 may also be connected with the amplitude selector system 53 through a condenser 87, said selector system comprising a pair of diode tubes 88 and 89, and a resistor 90. One side of the resistor 90, the anode of the diode 88, and the cathode of the diode 89 may be interconnected together and with the cathode of the tube 52 through the condenser 87. The other side of the resistor 90 may be connected with the cathode of the diode 88 and with the adjustable element of a potentiometer 91, said potentiometer being connected in series with a resistor 92 between ground and the power conductor 31.

The selector system 53 is adapted to deliver voltage of desired or selected amplitude, adjustable by means of the potentiometer 91, between the anode of the tube 89 and ground. The anode of the tube 89 is preferably connected to control the operation of the amplifier tube 55 through the timing circuit 54. Said timing circuit, as shown, may comprise a pair of triode tubes 93 and 94 having cathodes electrically connected to ground, and anodes connected with the power supply conductor 31 respectively through resistors 93' and 94'. The anode of the diode 89 may be electrically connected with the grid of the principal triode 93 of the timing circuit. The grid of said triode may also be connected with the anode of the secondary triode 94 through a resistor 95 and a network comprising a condenser 96 and a resistor 97 connected in parallel with the condenser, the resistance connected side of said network being connected with the power supply conductor 32 through a resistor 98.

The anode of the principal triode may also be connected with the grid of the secondary triode 94 through a condenser 99, the grid of said secondary triode 94 being also connected to ground through a resistor 100, a potentiometer 101 and a resistor 102. The end of the potentiometer 101, which is connected with the resistor 102, is also preferably connected with the adjustable element of the potentiometer and with the power supply conductor 32 through a resistor 103. The anode of the principal triode 93 may be connected with the control grid of the amplifier tube 55 through a resistor 104, said control grid of the tube 55 being connected with the power supply conductor 32 through a resistor 105.

The principal triode 93 of the timing circuit, accordingly, may be maintained normally in current conducting condition, between the anode and cathode thereof, thereby holding the tube 55 inoperative, so long as potential applied upon the grid of the triode 93, through the amplitude selecting circuit, remains normal at a selected operating value. As soon as the voltage applied through the selector system 53 increases beyond a predetermined normal operating value, the principal triode 93 of the timing circuit will become non-conducting, thereby allowing the application of tube actuating voltage upon the grid of the amplifier tube 55 to cause the same to operate for the actuation of the device 28. Simultaneously, the secondary triode 94 of the timing circuit, which is normally held in non-conducting condition, will become conducting as the result of leakage of voltage from the plate of the principal triode 93 through the condenser 99 to the control grid of the triode 94, and thence to ground through the adjustable potentiometer 101 which will determine the duration of the interval while the principal triode remains non-conducting for the operation of the tube 55.

The function of the secondary triode 94 is merely to delay the return of the principal triode to conducting condition in order to maintain operation of the amplifier tube 55 during an interval sufficient to assure operation not only of the device 28, but also of such other operable load devices as may be controlled by the relay switch 83, it being understood that the relay switches 83 may be interconnected to control the operation of one or more devices required to function in response to the transmission of a signaling impulse in the system 27. Since the signaling impulse transmitted in the system 27 may be of exceedingly short duration, it is desirable to provide means, such as the timing circuit 54, to assure that the amplifier tube, and the relay means controlled thereby, do not become inactive following operation thereof so rapidly that devices controlled by the relay means 82, 83 fail to operate.

The graphical representations comprising Figs. 3 and 6 show signal controlling voltage prevailing between ground and the control grid 34 of the amplifier 29, while the system is in operation for the inspection of containers for depth of fill at a desired fill level.

The graphical representations comprising Figs. 4 and 7 show signal voltage as delivered by the cathode follower tube 52 across the resistor 86 in response, respectively, to the application of the signal control voltages shown in Figs. 3 and 6 upon the control grid of the amplifier 29.

The graphical representations comprising Figs. 5 and 8 show signal voltage delivered at the anode of the triode 93 for the operation of the relay actuating amplifier tube 55 in response, respectively, to the application of the signal control voltages shown in Figs. 3 and 6 upon the control grid of the amplifier 29.

The voltage conditions depicted in Figs. 3, 4, and 5 prevail during an inspection interval when two successive containers not filled to the desired level pass through the scanning beam 13.

The voltage conditions shown in Figs. 6, 7, and 8 prevail during an interval when a container not filled to the desired level passes through the scanning beam followed immediately by a container filled to the desired level, the filled container, in turn, being immediately followed by one which is not filled to the desired level.

From a scrutiny of Figs. 3 and 6, it will be seen that the signal controlling voltage applied to the amplifier 29 includes a uniformly fluctuating component corresponding with the alternating characteristics of power applied to the ray generator for the operation of the same. Such uniformly fluctuating component, however, does not affect the operation of the amplifier tube 55, nor of the operable device 28 controlled by the tube. As soon, however, as the average intensity of the scanning beam 13 increases due to reduction of opacity in the articles being inspected, the average voltage applied to the amplifier 29 shows appreciable increase, thereby giving rise to the voltage conditions illustrated in Figs. 4 and 7 in the output circuit of the cathode follower tube 52. Such voltage increase, as modified by the selector system 53 and the timing circuit, appears as a corresponding uni-directional voltage peak adapted to cause operation of the tube 55 whenever such voltage peak appears in the translation system, the voltage conditions illustrated in Figs. 5 and 8 comprising voltage at a uniform level incapable of operating the tube 55 during interpeak intervals.

Means may be provided, in conjunction with the resistor 76 and condenser 77, which are connected between ground and the cathode of the monitoring detector controlled tube 67, for actuating any desired warning or system disabling device in the event of failure or deterioration of the X-ray source below a satisfactory ray intensity level. Such warning or disabling means may comprise a relay 106 controlled by the output of the tube 67. Such relay may comprise an operating coil 107 and switch means 108 controlled by the coil and interconnected for the control or operation of suitable warning or system disabling devices. In order to operate the warning control relay, its coil 107 may be interconnected in the plate circuit of an amplifier tube 109. As shown, the cathode of the amplifier tube 109 may be connected to ground and its anode connected with the power supply conductor 31 through the relay coil 106 and a resistor 109'.

The grid of the tube 109 may be interconnected through a resistor 110 with the adjustable element of a potentiometer 111. One side of the potentiometer 111 may be connected to ground. Its other side may be connected with the interconnected sides of the resistor 76 and the condenser 77, the so connected side of the potentiometer 111 being also connected through a resistor 112 with the power supply conductor 32. The tube 109 and its associated relay accordingly may be held in condition normally preventing the operation of the warning or signal disabling means controlled by the relay. Failure of the ray source 14 or decline of intensity of rays emitted thereby below a predetermined value will be shown in terms of altered output voltage of the tube 67, which voltage alteration may be applied through resistors 76, 110, 111, and 112 to cause operation of the tube 109 for the actuation of the warning or system disabling means controlled by the relay 106. Adjustment of the potentiometer 111, of course, within limits will determine the ray intensity level at which the warning means may be set to operate.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. The method of stabilizing a penetrating ray detection system, wherein a scanning ray emitted from a ray source is applied to a ray sensitive detector controllingly connected with a translation system embodying an electronic amplifier, which comprises measuring the response of said detector in terms of fluctuating potential, applying said potential to control the operation of said amplifier whereby to cause operation of a load device under the control of the translation system in accordance with the impingement intensity of the ray on the detector, while modulating the operation of the amplifier in accordance with intensity fluctuations in the ray as emitted at the ray source.

2. The method of stabilizing a penetrating ray detection system, wherein a scanning ray emitted from a ray source is applied to a ray sensitive detector controllingly connected with a translation system embodying an electronic amplifier, which comprises measuring the response of said detector in terms of fluctuating potential, applying said potential to control the operation of said amplifier whereby to cause operation of a load device under the control of the translation system in accordance with the impingement intensity of the ray on the detector, separately detecting intensity fluctuations of the ray as emitted at the ray source, and modulating the operation of the amplifier in accordance with such separately detected intensity fluctuations.

3. The method of stabilizing a penetrating ray detection system, wherein a scanning ray emitted from a ray source is applied to a sensitive scanning ray detector controllingly connected with a translation system embodying an electronic amplifier, which comprises measuring the response of said detector in terms of fluctuating potential, applying said potential to control the operation of said amplifier whereby to cause operation of a load device under the control of the translation system in accordance with the impingement intensity of the scanning ray on the detector, separately detecting intensity fluctuations of the ray as emitted at the ray source, and modulating the operation of the amplifier in accordance with such separately detected intensity fluctuations, to thereby nullify the effect in the translation system of such source intensity fluctuations applied by action of the scanning detector.

4. The method of inspection which comprises the application of a penetrating ray beam from a ray emitting source through an object under inspection, the measurement, in terms of fluctuating electrical potential, of ray beam intensity after same has passed through the object under inspection, the application of said potential for the control of an electronic amplifier and associated signal translation system embodying the same, in order to operate a load device under the control of said system, and the modulation of the operation of said amplifier in accordance with intensity fluctuations of the beam as emitted by the source.

5. Penetrating ray detection apparatus comprising a ray source, an operable load device, a ray sensitive scanning detector disposed in position to receive a ray beam from said source, a translation system embodying an electron flow signal relay device controllingly associated with said scanning detector and operable to transmit a signal corresponding with the impingement intensity of said ray beam on the scanning detector, for the operation of said load device, and a monitoring detector responsive to the intensity of rays emitted by said source and operatively associated with said signal relay device to modulate the operation thereof in accordance with ray source intensity fluctuations.

6. Penetrating ray detection apparatus comprising a ray source, an operable load device, a ray sensitive scanning detector disposed in position to receive a ray beam from said source, a translation system embodying an electron flow signal relay device having a control grid, means to measure the response of said scanning detector, in terms of correspondingly fluctuating potential, and to apply said potential on said control grid whereby to cause said system to transmit a signal corresponding with the impingement intensity of said ray beam on the scanning detector, for the operation of said load device, a monitoring detector responsive to the intensity of rays emitted by said source, and means to measure the response of said monitoring detector in terms of electrical potential and to apply the same to said control grid of said signal relay device to modulate the operation thereof in accordance with ray source intensity fluctuations.

7. Penetrating ray detection apparatus comprising a ray source, a ray sensitive scanning detector disposed in position to receive a ray beam from said source, a translation system controllingly associated with said scanning detector and operable to transmit a signal corresponding with the impingement intensity of said ray beam on the scanning detector, an operable load device, and a normally inactive timing circuit operable to actuate said load device during an operating interval of predetermined duration, said timing circuit being controllingly connected with said translation system for activation in response to transmission, in said system, of a signal of intensity at or above a preselected intensity level.

8. Penetrating ray detection apparatus comprising a ray source, a ray sensitive scanning detector disposed in position to receive a ray beam from said source, a translation system controllingly associated with said scanning detector and operable to transmit a signal corresponding with the impingement intensity of said ray beam on the scanning detector, an operable load device and timing means operable to actuate said load device during an operating interval of predetermined duration, said timing means comprising an electron flow device normally operable to hold said load device inactive, said electron flow device being controllingly connected with said translation system and adapted to become disabled, thereby permitting actuation of said load device, in response to delivery in said system of a signal impulse of predetermined intensity and time delay means operatively associated with said electron flow device to return the same to operating condition after an interval of predetermined duration following delivery of said signal impulse.

9. Penetrating ray detection apparatus comprising a ray source, a ray sensitive scanning detector disposed in position to receive a ray beam from said source, a translation system controllingly associated with said scanning detector and operable to transmit a signal corresponding with the impingement intensity of said ray beam on the scanning detector, said translation system comprising an electron flow signal relay device, an electron flow cathode following device drivingly connected with said signal relay device, and a normally inactive load device controllingly connected with said cathode following device and adapted for operation in response to delivery of a signal of predetermined intensity by said cathode following device.

10. Penetrating ray detection apparatus comprising a ray source, a ray sensitive scanning detector disposed in position to receive a ray beam from said source, a translation system controllingly associated with said scanning detector and operable to transmit a signal corresponding with the impingement intensity of said ray beam on the scanning detector, said translation system comprising an electron flow signal relay device, a normally inactive load device, and electronic timing apparatus connected with said load device and operable to cause actuation thereof during an operating interval of predetermined duration in response to the delivery of a signal of predetermined intensity from said relay.

11. Penetrating ray detection apparatus comprising a ray source, a ray sensitive scanning detector disposed in position to receive a ray beam from said source, a translation system controllingly associated with said scanning detector and operable to transmit a signal corresponding with the impingement intensity of said ray beam on the scanning detector, said translation system comprising an electron flow signal relay device, an electron flow cathode following device drivingly connected with said signal relay device, a normally inactive load device and means including electron timing apparatus connected with said cathode following device and operable to actuate said load device during an operating interval of predetermined duration in response to delivery of a signal of predetermined intensity through said cathode following device.

12. Penetrating ray detection apparatus for the high speed inspection of examination objects comprising a penetrating ray source of cyclically fluctuating intensity adapted to emit penetrating rays, a variable impedance ray sensitive semi-conductor forming a scanning detector disposed in position to receive a ray beam from said source including means for traveling an examination object transversely across said ray beam at relatively high speed, means to continuously measure the fluctuating impedance characteristics of said detector, a translation system controllingly associated with said detector and operable to transit a signal corresponding with the so measured impedance characteristics of the detector, and a monitoring detector responsive to the intensity of rays emitted by said source and operatively associated with said translation system for modulating the signal transmitting operation thereof in accordance with ray source intensity fluctuations.

13. Penetrating ray detection apparatus comprising a ray source, a ray sensitive scanning detector disposed in position to receive a ray beam from said source, a translation system controllingly associated with said scanning detector and operable to transmit a signal corresponding with the impingement intensity of said ray beam on the scanning detector, said translation system comprising an electron flow signal relay having a control grid operatively connected with said scanning detector, a normally inactive load device, electronic timing apparatus connected with said load device and operable to cause actuation thereof in response to the delivery of a signal of predetermined intensity from said relay, said timing apparatus comprising an electron flow device connected with said load device and normally operable to hold the same inactive, said electron flow device being controllingly connected with said relay and adapted to become disabled, thereby permitting actuation of the load device, upon delivery of a signal impulse of predetermined intensity from said relay, and time delay means operatively associated with said electron flow device to delay the return thereof to operating condition following application thereto of a signal impulse.

14. Penetrating ray detection apparatus comprising a ray source, a ray sensitive scanning detector disposed in position to receive a ray beam from said source, a translation system controllingly associated with said scanning detector and operable to transmit a signal corresponding with the impingement intensity of said ray beam on the scanning detector, said translation system comprising an electron flow signal relay having a control grid operatively connected with said scanning detector, a normally inactive load device, electronic timing apparatus connected with said load device and operable to cause actuation thereof in response to the delivery of a signal of predetermined intensity from said relay, said timing apparatus comprising a principal electron flow device connected with said load device and normally operable to hold the same inactive, said electron flow device being controllingly connected with said relay and adapted to become disabled, thereby permitting operation of the load device, upon delivery of a signal impulse of predetermined intensity from said relay, and time delay means comprising a normally inactive electron flow device controllingly connected with said relay and operable upon delivery of a signal impulse to delay the return of said principal flow device to normal operating condition, including adjustable means for adjusting the time delayed return of said normally inactive flow device to inactive condition.

15. Penetrating ray detection apparatus comprising a ray source, a ray sensitive scanning detector disposed in position to receive a ray beam from said source, a translation system controllingly associated with said scanning detector and operable to transmit a signal corresponding with the impingement intensity of said ray beam on the scanning detector, said translation system comprising an electron flow signal relay having a control grid operatively connected with said scanning detector, an electron flow cathode following device drivingly connected with said signal relay, a normally inactive load device controllingly connected with said cathode following device and adapted for operation in response to delivery of a signal of predetermined intensity by said cathode following device, and a monitoring detector for measuring the intensity of rays emitted by said ray source and operatively associated with the control grid of said signal relay to modulate the operation thereof and of the translation system in accordance with ray source intensity fluctuations.

16. Penetrating ray detection apparatus comprising a ray source, a ray sensitive scanning detector disposed in position to receive a ray beam from said source, a translation system controllingly associated with said scanning detector and operable to transmit a signal corresponding with the impingement intensity of said ray beam on the scanning detector, said translation system comprising an electron flow signal relay having a control grid operatively connected with said scanning detector, an electron flow cathode following device drivingly connected with said signal relay, a normally inactive load device controllingly connected with said cathode following device and adapted for operation in response to delivery of a signal of predetermined intensity by said cathode following device, and a monitoring detector for measuring the intensity of rays emitted by said ray source and operatively associated with the control grid of said signal relay to modulate the operation thereof and of the translation system in accordance with ray source intensity fluctuations, said monitoring detector being controllingly associated with an electron flow relay device drivingly connected with the control grid of the signal relay.

17. Penetrating ray detection apparatus comprising a ray source, a ray sensitive scanning detector disposed in position to receive a ray beam from said source, a translation system controllingly associated with said scanning detector and operable to transmit a signal corresponding with the impingement intensity of said ray beam on the scanning detector, said translation system comprising an electron flow signal relay having a control grid operatively connected with said scanning detector, an electron flow cathode following device drivingly connected with said signal relay, a normally inactive load device controllingly connected with said cathode following device and adapted for operation in response to delivery of a signal of predetermined intensity by said cathod following device, a monitoring detector for measuring the intensity of rays emitted by said ray source and operatively associated with the control grid of said signal relay to modulate the operation thereof and of the translation system in accordance with ray source intensity fluctuations, and normally inactive warning or system disabling means controlled by said monitoring detector for operation in the event of ray source failure or deterioration of rays emitted therefrom below a predetermined intensity value.

18. Penetrating ray detection apparatus for the high speed inspection of examination objects comprising a penetrating ray source of cyclically fluctuating intensity, adapted to emit penetrating rays, an operable load device, a variable impedance, ray sensitive semi-conductor, forming a scanning detector disposed in position to receive a ray beam from said source, including means for traveling an examination object transversely across said ray beam at relatively high speed, means to continuously measure the fluctuating impedance characteristics of said detector, a translation system controllingly associated with said load device and said detector, and operable to transmit a signal corresponding with the so measured impedance characteristics of the detector for the operation of said load device, and a monitoring detector responsive to the intensity of rays emited by said source, said monitoring detector being operatively associated with said translation system for modulating the signal transmitting operations thereof, in accordance with ray source intensity fluctuations.

References Cited in the file of this patent

UNITED STATES PATENTS

| | | |
|---|---|---|
| 2,537,914 | Roop | Jan. 9, 1951 |
| 2,539,203 | Pohl | Jan. 23, 1951 |

OTHER REFERENCES

An Economical Industrial X-Ray Detector, by Frerichs and Jacobs, from General Electric Review, August 1951, pp. 42–45.

On the Conductivity Produced by CdS Crystals by Irradiation with Gamma-Rays, by Rudolf Frerichs, from Physical Review, vol. 76, No. 12, Dec. 15, 1949.